(12) United States Patent
Sato et al.

(10) Patent No.: US 7,479,338 B2
(45) Date of Patent: Jan. 20, 2009

(54) FUEL CELL SYSTEM

(75) Inventors: Yuusuke Sato, Bunkyo-ku (JP); Eiichi Sakaue, Shinagawa-ku (JP); Kei Matsuoka, Kawasaki (JP); Kentaro Tomioka, Sayama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 105 days.

(21) Appl. No.: 11/073,628

(22) Filed: Mar. 8, 2005

(65) Prior Publication Data

US 2005/0208352 A1   Sep. 22, 2005

(30) Foreign Application Priority Data

Mar. 15, 2004   (JP)   ............... 2004-072988

(51) Int. Cl.
  *H01M 8/04*   (2006.01)
(52) U.S. Cl. .............. 429/24; 429/13; 429/26
(58) Field of Classification Search ............ 429/13, 429/17, 26, 39
  See application file for complete search history.

(56) References Cited

U.S. PATENT DOCUMENTS

| | | |
|---|---|---|
| 5,599,638 A | 2/1997 | Surampudi et al. |
| 5,773,162 A | 6/1998 | Surampudi et al. |
| 6,146,781 A | 11/2000 | Surampudi et al. |
| 6,248,460 B1 | 6/2001 | Surampudi et al. |
| 6,254,748 B1 | 7/2001 | Surampudi et al. |
| 6,265,093 B1 | 7/2001 | Surampudi et al. |
| 6,303,244 B1 | 10/2001 | Surampudi et al. |
| 6,420,059 B1 | 7/2002 | Surampudi et al. |
| 6,537,692 B1 * | 3/2003 | Horiguchi et al. ............ 429/22 |
| 6,589,684 B1 | 7/2003 | Surampudi et al. |
| 6,632,409 B1 * | 10/2003 | Kuwaba ............... 422/198 |
| 6,703,150 B2 | 3/2004 | Surampudi et al. |
| 6,740,434 B2 | 5/2004 | Surampudi et al. |
| 6,811,905 B1 * | 11/2004 | Cropley et al. ............. 429/19 |
| 6,821,659 B2 | 11/2004 | Surampudi et al. |
| 2004/0062964 A1 | 4/2004 | Matsuoka et al. |
| 2004/0166389 A1 | 8/2004 | Matsuoka et al. |
| 2004/0224214 A1 | 11/2004 | Vamos et al. |
| 2005/0003254 A1 | 1/2005 | Surampudi et al. |
| 2005/0042487 A1 | 2/2005 | Surampudi et al. |
| 2006/0046133 A1 | 3/2006 | Surampudi et al. |
| 2006/0105210 A1 | 5/2006 | Surampudi et al. |

FOREIGN PATENT DOCUMENTS

| | | |
|---|---|---|
| JP | 55-108664 | 7/1980 |
| JP | 57-123661 | 8/1982 |
| JP | 57-196479 | 12/1982 |
| JP | 9-213359 | 8/1997 |
| JP | 2002-110199 | 4/2002 |
| JP | 2002-319420 | 10/2002 |
| JP | 2003-109637 | 4/2003 |
| JP | 2003-168462 | 6/2003 |

\* cited by examiner

*Primary Examiner*—Patrick Ryan
*Assistant Examiner*—Ben Lewis
(74) *Attorney, Agent, or Firm*—Oblon, Spivak, McClelland, Maier & Neustadt, P.C.

(57) ABSTRACT

A fuel cell system is provided with a fuel cell stack composed of one or more fuel cells, a discharging flow path for conducting an exhaust from the fuel cells connected to the fuel cells and a radiator for cooling the exhaust to a controlled temperature.

21 Claims, 4 Drawing Sheets

FUEL CELL SYSTEM

CROSS-REFERENCE TO RELATED APPLICATIONS

This application is based upon and claims the benefit of priority from the prior Japanese Patent Application No. 2004-072988 (filed Mar. 15, 2004); the entire contents of which are incorporated herein by reference.

BACKGROUND OF THE INVENTION

1. Field of the Invention

The present invention relates to a fuel cell system, which recycles water from an exhausted liquid of a fuel cell stack thereof.

2. Description of the Related Art

A direct methanol fuel cell (DMFC) is one of various types of fuel cells and capable of directly utilizing methanol as a fuel without reforming. The direct methanol fuel cell is ordinarily provided with a fuel cell stack, which includes one or more fuel cells. Each of the fuel cells is provided with a membrane electrode assembly (MEA), which is composed of a cathode catalyst layer, a cathode gas diffusion layer, an anode catalyst layer, an anode gas diffusion layer and an electrolyte membrane put between a cathode catalyst layer and an anode catalyst layer. A mixture of the methanol and water is supplied to the anode and air is supplied to the cathode. As a result of reaction in the fuel cell, water is generated and exhausted from the cathode.

The water is necessary for generating the reaction in the DMFC and for this purpose the water generated in the reaction is sometimes recycled. Japanese Patent Application Laid-open No. 2002-110199 discloses a related art, in which the water exhausted from the cathode is recycled. According to this related art, the fuel cell system is provided with a mixing tank and the recycled water and fuel supplied from a fuel tank is mixed to form a mixture therein. The recycled water contained in the mixture is supplied to the anode of the DMFC. However, the recycled water has relatively high temperature and causes an increase in temperature of the mixture in the mixing tank. The increase in temperature leads to an increase in loss of methanol since vapor pressure thereof increases and the vaporized methanol is lost in an exhaust from the mixing tank.

SUMMARY OF THE INVENTION

According to a first aspect of the present invention, a fuel cell system is provided with: one or more fuel cells, each of the fuel cells having an anode and a cathode; a mixing tank supplying a fuel to the anode; a discharging flow path connected to the fuel cells, the discharging flow path conducting an exhaust from the fuel cells to the mixing tank; and a radiator installed on the discharging flow path, the radiator cooling the exhaust to a controlled temperature.

According to a second aspect of the present invention, a fuel cell system is provided with: a fuel cell stack having one or more fuel cells; a discharging flow path discharging an exhaust from the fuel cell stack; a mixing tank supplying a fuel to the fuel cell stack; and a radiator condensing water from the exhaust in a controllable amount and recycling the water to the mixing tank.

DETAILED DESCRIPTION OF THE INVENTION

Figure 1:
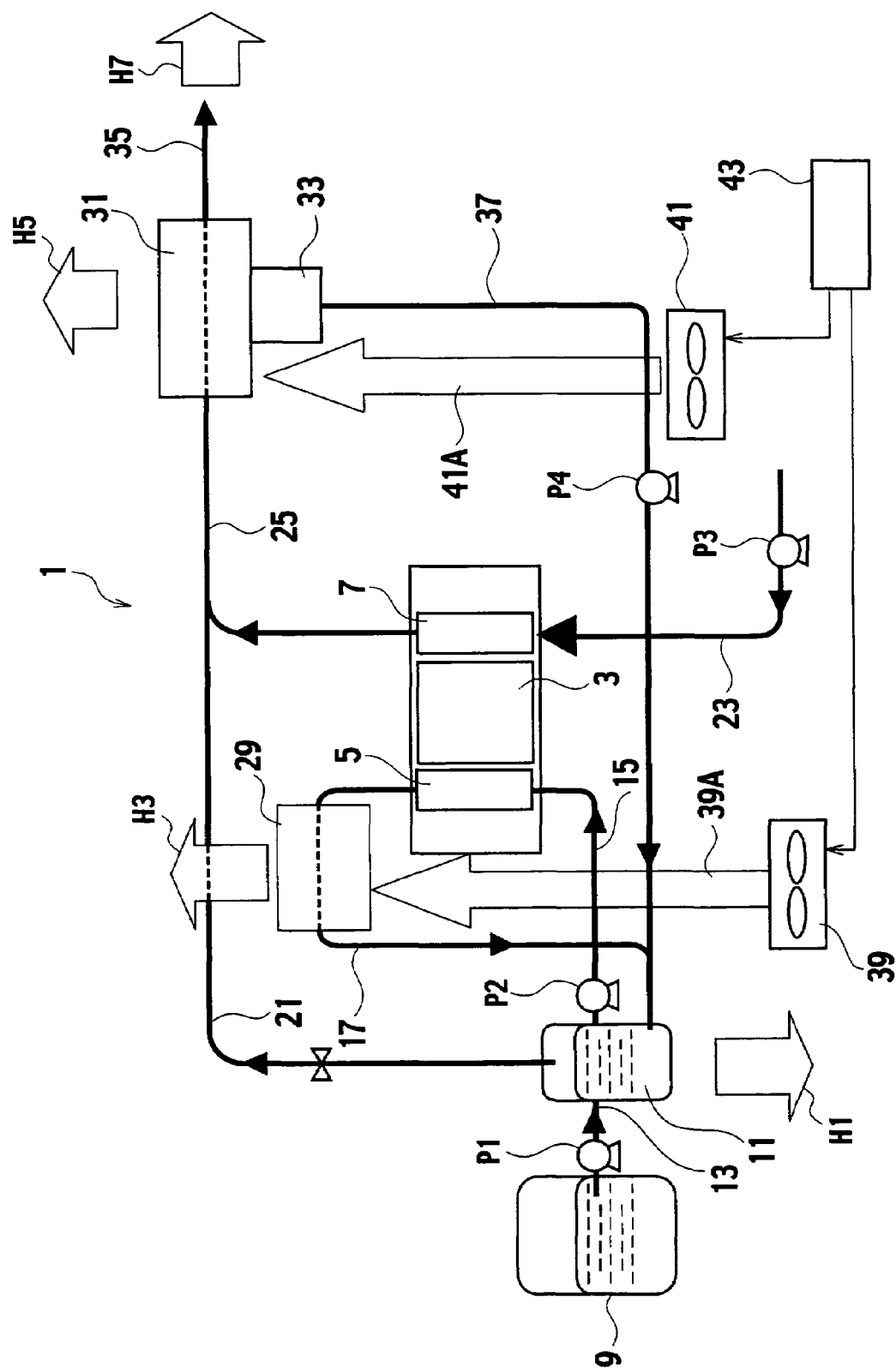
FIG. 1 is a schematic illustration of a fuel cell system according to a first embodiment of the present invention.

Referring now to FIG. 1, a fuel cell system 1 according to a first embodiment of the present invention is provided with a fuel cell stack 3, a fuel tank 9 and a mixing tank 11. The fuel cell stack 3 is composed of one or more fuel cells, each of which is provided with an anode 5, a cathode 7 and a membrane electrode assembly (MEA) interposed therebetween. The MEA is composed of a cathode catalyst layer, a cathode gas diffusion layer, an anode catalyst layer, an anode gas diffusion layer and an electrolyte membrane put between a cathode catalyst layer and an anode catalyst layer (not shown). Needless to say, plural anodes 5 and plural cathodes 7 may be included in the fuel cell system 1, however, the following description will be given to a case of one anode 5 and one cathode 7 for ease of explanation.

The fuel tank 9 is linked to the mixing tank 11 via a connection flow path 13, on which a pump P1 intervenes. The mixing tank 11 is linked to the anode 5 via a fuel supply path 15, on which a pump P2 intervenes. An outflow path 17 links the anode 5 to the mixing tank 11 and is provided with an anode-side radiator 29.

A mixture of methanol and water pooled in the mixing tank 11 is supplied to the anode 5 via the fuel supply path 15 and used for reaction therein. Unreacted methanol aqueous solution included in an exhaust gas from the anode 5 is cooled at the anode-side radiator 29 and then recycled into the mixing tank 11 via the outflow path 17.

The mixing tank 11 is further linked to an exhaust flow path 21. The exhaust flow path 21 is merged with a discharging flow path 25 from the cathode 7. The discharging flow path 25 is provided with a cathode-side radiator 31 having a water collector tank 33 and linked to the exterior of the fuel cell system 1. The water collector tank 33 is linked to the mixing tank 11 via a connection flow path 37 on which a pump P4 intervenes so as to feed water into the mixing tank 11.

Ventilators 39 and 41 and airflow paths 39A and 41A are further provided. The ventilator 39 feeds air to the anode-side radiator 29 through the airflow path 39A and the ventilator 41 feeds air to the cathode-side radiator 31 through the airflow path 41A for respective cooling. The ventilators 39 and 41 are respectively controllable with respect to air-feeding rates and a controller unit 43 is provided for control thereof, thereby cooling efficiencies of the radiators 29 and 31 are controllable.

The controller unit 43 is configured to control the air-feeding rates of the ventilators 39 and 41 in response to a state, regarding a generating power, a generating heat and such, of the fuel cell stack 3. Ambient temperature around the anode-side radiator 29, the cathode-side radiator 31, the mixing tank 11, or the fuel cell stack 3 can be measured by a sensor (not shown). The controller unit 43 stores a data table regarding data of relations between values of current or temperature and required air-feeding rates. The controller unit 43 controls the air-feeding rates of the ventilators 39 and 41 on the basis of values detected by sensors (not shown) and the data table. For example, the data table has the relationship between power generation current, ambient temperature, and the ventilator motor rotation speed of the ventilators 39 and 41. The ventilator motor rotation speed affect the the air-feeding rate.

When the mixture of methanol and water as the fuel pooled in the mixing tank 11 is supplied to the anode 5 and air is supplied to the cathode 7, an anodic reaction:

$$CH_3OH+H_2O \rightarrow CO_2+6H^++6e^-$$

occurs at the anode 5 and a cathodic reaction:

$$3/2 O_2+6H^++6e^- \rightarrow 3H_2O$$

occurs at the cathode 7. The methanol at the anode 5 partly crosses over to the cathode 7 and an oxydation reaction thereof:

$$CH_3OH+3/2\ O_2 \rightarrow CO_2+2H_2O$$

may occur at the cathode.

Quantities of methanol consumed by the anodic reaction per unit time ($q_{MeOH}^a$), consumed water per unit time ($q_{H2O}^a$) and generated carbon dioxide per unit time ($q_{CO2}^a$) in each cell can be represented by equations:

$$q_{MeOH}^a = \left(\frac{I_{op}}{6F} + \frac{I_{c.o.}}{6F}\right) \quad (1)$$

$$q_{H_2O}^a = \left(\frac{I_{op}}{6F} + \frac{n_d I_{op}}{F} + \alpha\right) \quad (2)$$

$$q_{CO_2}^a = \frac{I_{op}}{6F} \quad (3)$$

where F is the Faraday constant, $I_{OP}$ is current, $I_{C.O.}$ is a proton current converted from quantity of the crossover methanol, $n_d$ is a number of water molecules which one proton carries and α is a molar flux of moving water by percolation and diffusion. In a case where the fuel cell stack 3 is composed of N fuel cells, those quantities should be multiplied by N.

Quantities of oxygen consumed by the cathodic reaction per unit time ($q_{O2}^c$), generated water per unit time ($q_{H2O}^c$) and generated carbon dioxide per unit time ($q_{CO2}^a$) in each cell can be represented by equations:

$$q_{O_2}^c = \left(\frac{I_{op}}{4F} + \frac{I_{c.o.}}{4F}\right) \quad (4)$$

$$q_{H_2O}^c = \left(\frac{3I_{op}}{6F} + \frac{n_d I_{op}}{F} + \frac{2I_{c.o.}}{6F} + \alpha\right) \quad (5)$$

$$q_{CO_2}^c = \frac{I_{c.o.}}{F} \quad (6)$$

In a case where the fuel cell stack 3 is composed of N fuel cells, those quantities should be multiplied by N.

The water existing at the cathode 7 tends to form liquid water and water vapor having saturation vapor pressure at an occasional temperature. Control of the water saturation vapor pressure by temperature control, namely cooling in this case, leads to control of a ratio of a part to be recycled and a part to be exhausted.

Meanwhile, amount of water generated by the electricity generation (the cathodic reaction), which appears as a first term in the right side of the equation (5), is represented by:

$$q_{H_2O\_pwr} = \frac{3I_{op}}{6F} \quad (7)$$

In a case where the fuel cell stack 3 is composed of N fuel cells, the quantity should be multiplied by N.

Amount of water allowed to be exhausted to the atmosphere is a balance of the equation (2) subtracted from the equation (5) and is hence represented by:

$$q_{H_2O\_rls} = \left(\frac{2I_{op}}{6F} + \frac{2I_{c.o.}}{6F}\right) \quad (8)$$

In a case where the fuel cell stack 3 is composed of N fuel cells, the quantity should be multiplied by N.

The first term of the right side of the equation (8) corresponds to two-thirds of the right side of the equation (7) and the second term corresponds to water generated from a crossover methanol. More specifically, the two-thirds of the amount of water generated by the electricity generation reaction and the whole of the water generated by the crossover methanol are allowed to be exhausted to the atmosphere. The remaining one-third of the amount of water represented by the equation (7) should be recycled so as to meet a demand in the fuel cell system 1.

Accordingly, to recycle the amount of water so as to meet the demand, a saturation vapor pressure of water $P^{sat}_{H2O}$ in the gas exhausted from the cathode 7 is required to be:

$$P^{sat}_{H_2O}(T_{fin\_cathode}) = \frac{N\left(\frac{2I_{op}}{6F} + \frac{2I_{c.o.}}{6F}\right)}{F_{cathode\_out}} P \quad (9)$$

where $T_{fin\_cathode}$ is a temperature required for condensation of the demanded amount of water for recycling, $F_{cathode\_out}$ is a flow rate of the gas exhausted from the cathode 7 in volume per unit time, P is gas pressure in the cathode-side radiator 31. $P^{sat}_{H2O}(T)$ as a function of a temperature T has been experimentally evaluated. Therefore the temperature $T_{fin\_cathode}$ required so as to recycle the water in the amount meeting a demand in the fuel cell system 1 can be calculated from the equation (9). The following equation (10) shows an example of the relationship between water vapor pressure and temperature:

$$\ln p^{sat}_{H_2O}[Pa] = 23.1964 - \frac{3816.44}{-46.13 + T[K]}. \quad (10)$$

Regulating the temperature of the cathode-side radiator 31 to be $T_{fin\_cathode}$ given by the above equation (9) results in that the required amount of water is condensed and recycled from the exhaust exhausted from the cathode 7. The temperature of the cathode-side radiator 31 is regulated by an air-feeding rate of the ventilator 41 under the control of the controller unit 43 on the basis of the data table stored therein.

The required temperature of the cathode-side radiator 31 may be changed according to a value of the current generated by the fuel cell stack 3 as being understood from the equation (9). The controller unit 43 detects the value of the current and thereby regulates the air-feeding rates of the ventilators 39 and 41 so as to properly regulate the cooling efficiencies of the radiators 29 and 31. Or temperature of the radiator 31 may be controlled in ordinary temperature feedback manner.

As being understood from the above description, at the anode-side radiator 29, the water can be recycled from the exhaust exhausted from the fuel cell stack 3 in neither too much nor too little amount. More specifically, the mixture of methanol and water as a fuel pooled in the mixing tank 11 is supplied to the anode 5 and the air is supplied to the cathode 7 so that electricity is generated. Then the exhaust exhausted from the anode 5 is cooled at the anode-side radiator 29 so that unreacted water and methanol is cooled to a proper temperature and recycled to the mixing tank 11.

The exhaust exhausted from the cathode 7 is cooled at the cathode-side radiator 31. Then condensed water is fed to the water collector tank 33 and excessive exhaust is exhausted from an exhaust flow path 35 to the atmosphere. The recycled water in the water collector tank 33 is re-used for diluting the methanol supplied from the fuel tank 9 to the mixing tank 11.

Accordingly, methanol pooled in the fuel tank 9 is unnecessary to be diluted in advance and hence concentrated methanol can be applied. Moreover, a water tank for diluting the concentrated methanol is unnecessary, thereby the whole constitution can be simplified and miniaturized.

The required amount of the water can be recycled from the exhaust exhausted from the fuel cell stack 3 in neither too much nor too little amount since the cathode-side radiator 31 recycles the water in the required amount by means of proper regulation of the ventilator 41 under the control of the controller unit 43 according to the operation condition of the fuel cell stack 3. Furthermore, electricity for driving the ventilator 41 is saved since the controller unit 43 is capable of controlling the ventilator 41 in an optimum feeding rate.

The anode-side radiator 29 also cools the exhaust from the anode 5 to a proper temperature so as to control the fuel cell stack 3 at certain temperature by means of proper regulation of the ventilator 39 under the control of the controller unit 43.

The fuel cell stack 3 generates heat accompanying with the electricity generation. The heat is removed from the fuel cell stack 3 as latent heat of vaporization of the water at the cathode 7. The heat is further removed from the fuel cell stack 3 by sensible heat of anode and cathode feed. Those heats are mainly radiated from the exhaust both at the anode-side radiator 29 and the cathode-side radiator 31 and heat-radiation from both the fuel cell stack 3 and the mixing tank 1. Thereby the temperature of the fuel cell stack 3 is regulated in a proper range.

Figure 2:
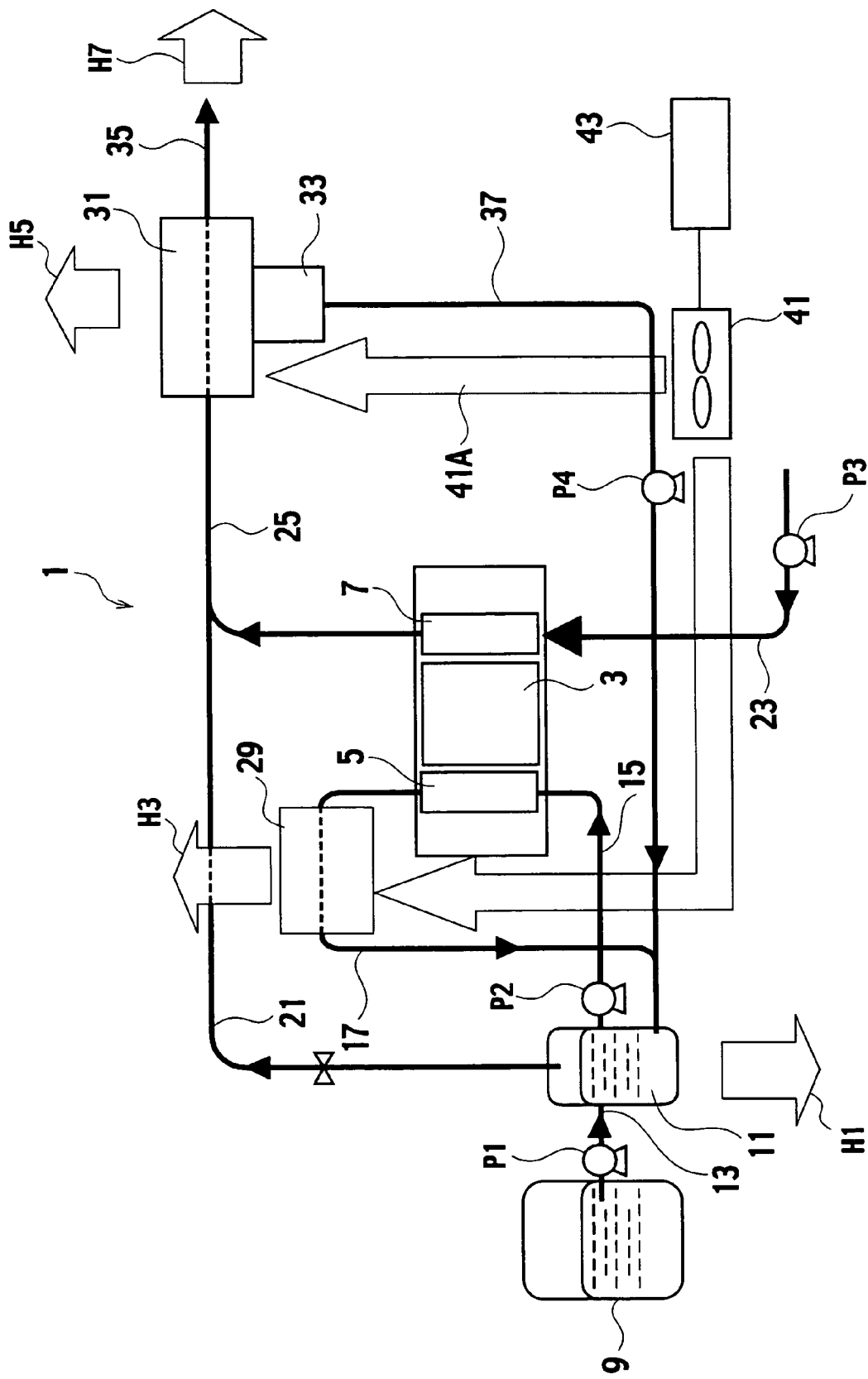
FIG. 2 is a schematic illustration of a fuel cell system according to a modification of the first embodiment of the present invention.

The first embodiment of the present invention may be modified as shown in FIG. 2. According to the present modification, single ventilator 41 feeds and distributes air to both the anode-side radiator 29 and the cathode-side radiator 31. The distribution of the air can be achieved in predetermined air-feeding rates or, alternatively, airflow paths 41A and 41B may be respectively provided with throttles or such for regulating the respective air-feeding rates. The present modification provides effects substantially identical to the aforementioned first embodiment of the present invention.

A second embodiment of the present invention will be described hereinafter with reference to FIG. 3. In these drawings and the following description, substantially the same elements as the aforementioned first embodiment are referenced with the same numerals and detailed description thereof will be omitted.

Figure 3:
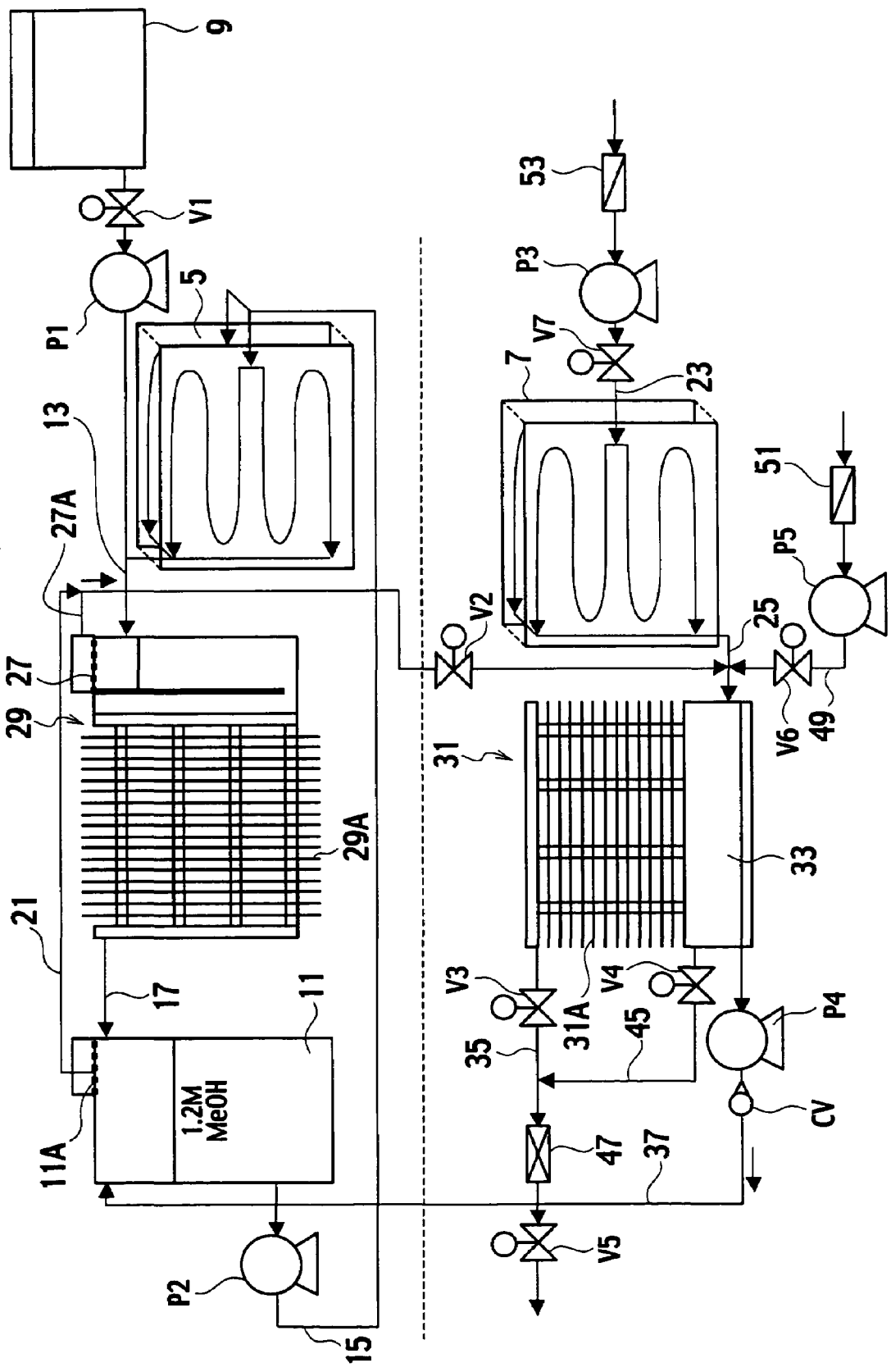
FIG. 3 is a schematic illustration of a fuel cell system according to a second embodiment of the present invention.

Though FIG. 3 is drawn as if the anode 5 and the cathode 7 are separated from each other for convenience of the description, the anode 5 and the cathode 7 are formed in a unitary body with the MEA interposed therebetween. Moreover, the ventilators 39 and 41 are not shown in FIG. 3 but provided in the same manner as the aforementioned first embodiment as shown in FIG. 1 or 2.

An open-and-closable valve V1 is interposed between the fuel tank 9 and the pump Pl. The pump P1 is connected to the connection flow path 13. The connection flow path 13 links the anode 5 to the anode-side radiator 29. The anode-side radiator 29 is provided with a plurality of radiation fins 29A which is so dimensioned and configured to receive air fed by the ventilator 39 (not shown in FIG. 3). A gas-liquid separation membrane 27 is interposed between the connection flow path 13 and the radiator 29. An exhaust flow path 27A is connected to and merged with the exhaust flow path 21 from the mixing tank 11.

A gas-liquid separation membrane 11A is provided at a junction between the mixing tank 11 and the exhaust flow path 21.

The exhaust flow path 21 is connected with discharging flow path 25 from the cathode 7 and has an open-and-closable valve V2 disposed upstream of a junction of the exhaust flow paths 21 and 25.

Such configured fuel cell system 1 according to the second embodiment of the present invention makes it possible to condense water vapor and recycle unreacted water and methanol and further cool them to a sufficiently low temperature on the occasion of flowing back to the mixing tank 11. Thereby the mixing tank 11 is kept in a relatively low temperature.

The cathode-side radiator 31 is provided with a plurality of radiation fins 31A which is so dimensioned and configured to receive air fed by the ventilator 41 (not shown in FIG. 3) and connected with the exhaust flow path 35. The exhaust flow path 35 is provided with an open-and-closable valve V3 and connected with an exhaust flow path 45 downstream of the open-and-closable valve V3. The exhaust flow path 45 is connected with the water collector tank 33 and bypasses the cathode-side radiator 31. The exhaust flow path 45 is provided with an open-and-closable valve V4. The exhaust flow path 35 is further provided with an adsorbent unit 47 for adsorbing and removing volatile organic compounds (VOC) and an open-and-closable valve V5 disposed in this order. The connection flow path 37 linking the water collector tank 33 to the mixing tank 11 is provided with a check valve CV.

An air introduction path 49 is connected with the discharging flow path 25 and hence leads to the water collector tank 33. The air introduction path 49 is provided with a filter 51, a pump P5 for feeding air therein and an open-and-closable valve V6.

An air supply path 23 is provided so as to supply air to the cathode 7. The air supply path 23 is provided with a filter 53 and an open-and-closable valve V7.

A concentrated fuel supplied from the fuel tank 9 is mixed with the exhaust fluid exhausted from the anode 5 at the anode-side radiator 29, thereby the fuel and the exhaust is mixed enough to be a uniform concentration in the course of reaching the mixing tank 11.

The cathode-side radiator 31 allows the exhaust from cathode 7 in part to directly flow out to the atmosphere through the exhaust flow path 45 since the exhaust flow path 45 functions as a bypass flow path bypassing the cathode-side radiator 31. In a case where an excessive amount of water is condensed at the cathode-side radiator 31, which may happen when an atmospheric temperature is relatively low, opening the open-and-closable valve V4 and closing the open-and-closable valve V3 lead to prevention of over-condensation of the water. Furthermore, feeding atmospheric air to the water collector tank 33 via the air introduction path 49 gives rise to an increase in a flow rate in the cathode-side radiator 31, which leads to an increase in an amount of vapor accompanying the flow and a decrease in an amount of condensed water.

On the contrary, in a case where the amount of the condensed water is insufficient, the amount can be increased by an increase in the air feeding rate of the ventilator 41 so as to raise cooling efficiency.

As being understood from the above description, the amount of the recycled water can be kept in a proper range, thereby a concentrated fuel can be applied and pooled in the fuel tank 9. The mixture of methanol and water pooled in the mixing tank 11 can be kept in a relatively low temperature and hence vapors of water and methanol contained in the gas exhausted from the mixing tank can be suppressed so as to raise fuel efficiency.

Figure 4:
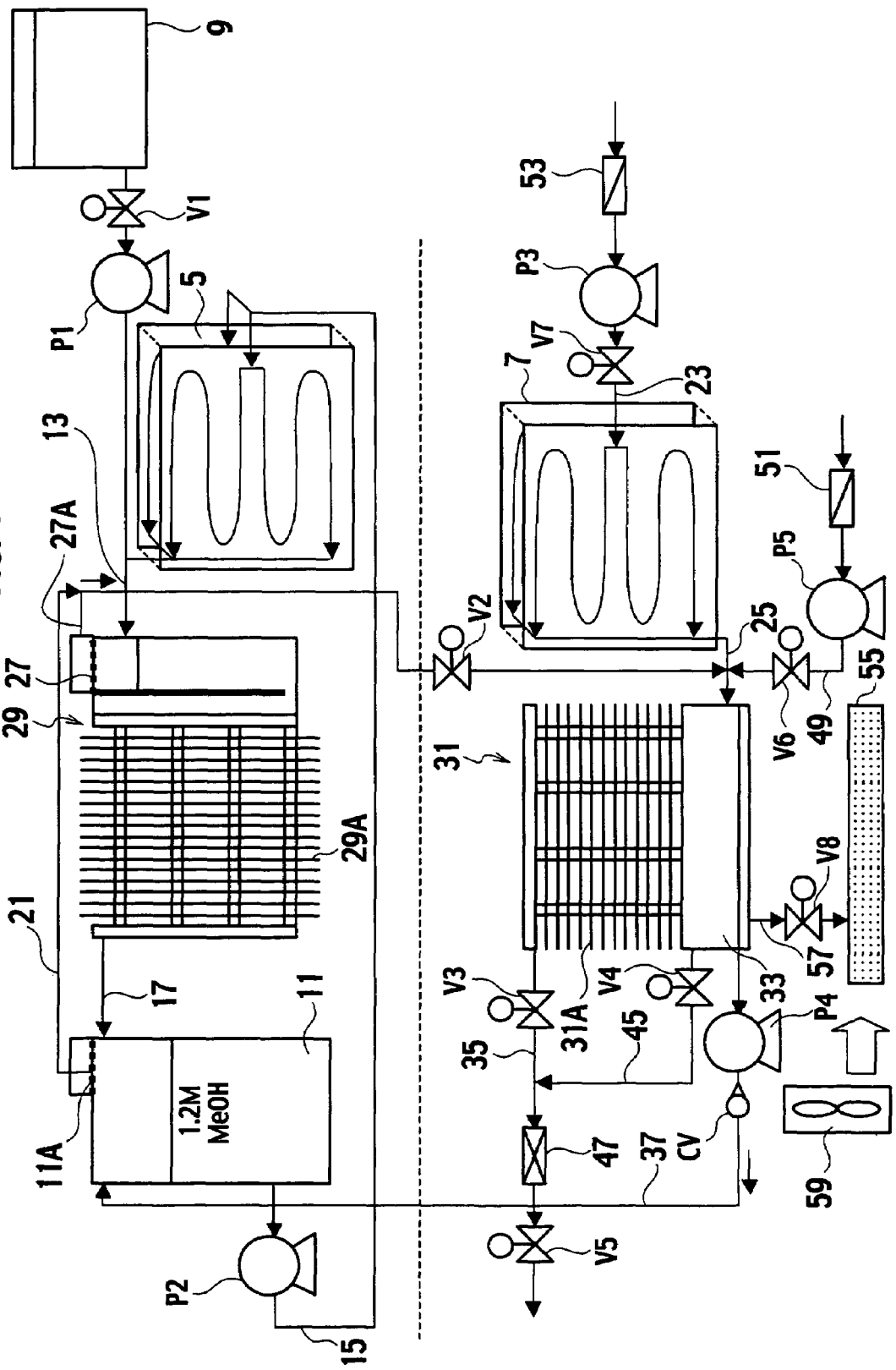
FIG. 4 is a schematic illustration of a fuel cell system according to a third embodiment of the present invention.

Referring to FIG. 4, according to a third embodiment of the present invention, a porous body 55 such as a sponge, a connection flow path 57 having an open-and-closable V8 and a ventilator 59 are further provided. The porous body 55 absorbs the recycled water collected by the water collector tank 33 and sent through the connection flow path 57. The ventilator 59 is configured to feed air to the porous body 55. In a case where an excessive amount of water is condensed at the cathode-side radiator 31, the water can be emitted in part to the atmosphere by opening the open-and-closable valve V8 and feeding air to the absorbed water.

This configuration provides effects substantially identical to any of the aforementioned embodiments of the present invention and further provides effects of water emission by means of the porous body 55.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A fuel cell system comprising:
    one or more fuel cells, each of the fuel cells having an anode and a cathode;
    a mixing tank supplying a fuel to the anode;
    a discharging flow path connected to the fuel cells, the discharging flow path conducting an exhaust from the fuel cells to the mixing tank;
    a radiator installed on the discharging flow path, the radiator cooling the exhaust to a controlled temperature so as to condense a controlled amount of water meeting a demand in the fuel cells;
    a ventilator controllably feeding air to the radiator; and
    a controller unit controlling the ventilator so as to control cooling the exhaust to the controlled temperature,
    wherein the controller unit calculates the controlled temperature in accordance with an equation of $$P_{H_2O}^{sat}(T_{\text{fin\_cathode}}) = \frac{N\left(\frac{2I_{op}}{6F} + \frac{2I_{c.o.}}{6F}\right)}{F_{\text{cathode\_out}}} P,$$

in which $T_{\text{fin\_cathode}}$ is the controlled temperature, $I_{op}$ is a current generated by the fuel cells, $I_{c.o.}$ is a proton current converted from a quantity of a crossover methanol through the fuel cells, F is the Faraday constant, $F_{\text{cathode\_out}}$ is a flow rate of gas exhausted from the cathodes, N is a number of the fuel cells, and P is gas pressure in the radiator.

2. The fuel cell system of claim 1, further comprising:
    a collector tank linked with the radiator and collecting condensed water from the exhaust; and
    a connection flow path linking the collector tank to the mixing tank.

3. The fuel cell system of claim 2, further comprising a water emitter emitting the condensed water as a vapor.

4. The fuel cell system of claim 1, wherein the controller unit comprises a data table of a relationship between values of a current generated by the fuel cells and feeding rates of the air fed by the ventilator and controls the ventilator according to the data table.

5. The fuel cell system of claim 1, further comprising a bypass flow path linking the discharging flow path to the mixing tank and bypassing the radiator.

6. The fuel cell system of claim 1, further comprising an airflow path linking the ventilator and the radiator.

7. A fuel cell system comprising:
    a fuel cell stack having one or more fuel cells;
    a discharging flow path discharging an exhaust from the fuel cell stack;
    a mixing tank supplying a fuel to the fuel cell stack;
    a radiator condensing water from the exhaust in a controlled amount and recycling the water to the mixing tank;
    a ventilator controllably feeding air to the radiator; and
    a controller unit controlling the ventilator so as to control the controlled amount,
    wherein the controller unit calculates the controlled temperature in accordance with an equation of $$P_{H_2O}^{sat}(T_{\text{fin\_cathode}}) = \frac{N\left(\frac{2I_{op}}{6F} + \frac{2I_{c.o.}}{6F}\right)}{F_{\text{cathode\_out}}} P,$$

in which $T_{\text{fin\_cathode}}$ is the controlled temperature, $I_{op}$ is a current generated by the fuel cells, $I_{c.o.}$ is a proton current converted from a cluantity of a crossover methanol through the fuel cells. F is the Faraday constant, $F_{\text{cathode\_out}}$ is a flow rate of gas exhausted from the cathodes, N is a number of the fuel cells, and P is gas pressure in the radiator.

8. The fuel cell system of claim 7, wherein the controller unit comprises a data table of a relationship between values of a current generated by the fuel cells and feeding rates of the air fed by the ventilator and controls the ventilator according to the data table.

9. The fuel cell system of claim 7, further comprising a bypass flow path linking the fuel cell stack to the mixing tank and bypassing the radiator.

10. The fuel cell system of claim 7, further comprising an airflow path linking the ventilator and the radiator.

11. The fuel cell system of claim 7, further comprising a water emitter emitting the condensed water as a vapor.

12. A fuel cell system comprising:
    a fuel cell stack having one or more fuel cells;
    a discharging flow path discharging an exhaust from the fuel cell stack;
    a mixing tank supplying a fuel to the fuel cell stack;
    a radiator condensing water from the exhaust in a controlled amount and recycling the water to the mixing tank;
    a ventilator controllably feeding air to the radiator; and
    a controller unit controlling the ventilator so as to control the controlled amount.

wherein the controller unit calculates the controlled amount so as to balance the controlled amount of the condensed water with a demand in the fuel cells in accordance with an expression of $NI_{op}/6F$, in which N is a number of the fuel cells, $I_{op}$ is the current, and F is the Faraday constant.

13. The fuel cell system of claim 12, wherein the controller unit comprises a data table of a relationship between values of a current generated by the fuel cells and feeding rates of the air fed by the ventilator and controls the ventilator according to the data table.

14. The fuel cell system of claim 12, further comprising a bypass flow path linking the fuel cell stack to the mixing tank and bypassing the radiator.

15. The fuel cell system of claim 12, further comprising an airflow path linking the ventilator and the radiator.

16. The fuel cell system of claim 12, further comprising a water emitter emitting the condensed water as a vapor.

17. A fuel cell system comprising:
a fuel cell stack having one or more fuel cells;
a discharging flow path discharging an exhaust from the fuel cell stack;
a mixing tank supplying a fuel to the fuel cell stack;
a radiator condensing water from the exhaust in a controlled amount and recycling the water to the mixing tank;
a ventilator controllably feeding air to the radiator; and
a controller unit controlling the ventilator so as to control the controlled amount,
wherein the controller unit calculates the controlled amount so as to balance the controlled amount of the condensed water with a demand in the fuel cells to have water in an amount represented by an expression of $$N \cdot \left( \frac{2I_{op}}{6F} + \frac{2I_{c.o.}}{6F} \right),$$

allowed to be exhausted to the atmosphere, in which N is a number of the fuel cells, $I_{op}$ is the current generated by the fuel cell state, $I_{c.o.}$ is a proton current converted from quantity of a crossover methanol through the fuel cell stack, and F is the Faraday constant.

18. The fuel cell system of claim 17, wherein the controller unit comprises a data table of a relationship between values of a current generated by the fuel cells and feeding rates of the air fed by the ventilator and controls the ventilator according to the data table.

19. The fuel cell s stem of claim 17, further comprising a bypass flow path linking the fuel cell stack to the mixing tank and bypassing the radiator.

20. The fuel cell system of claim 17, further comprising an airflow path linking the ventilator and the radiator.

21. The fuel cell system of claim 17, further comprising a water emitter emitting the condensed water as a vapor.

* * * * *